Sept. 13, 1927.
J. J. WARREN
1,642,053
TRUING LATHE FOR WOOD PULP GRINDERS
Original Filed Oct. 14, 1922   2 Sheets-Sheet 1

John J. Warren
INVENTOR
BY Pennie, Davis, Marvin ...
his ATTORNEYS

Sept. 13, 1927. 1,642,053
J. J. WARREN
TRUING LATHE FOR WOOD PULP GRINDERS
Original Filed Oct. 14, 1922 2 Sheets-Sheet 2

INVENTOR
John J. Warren
BY
Pennie, Davis, Marvin & Edmunds
his ATTORNEYS

Patented Sept. 13, 1927.

1,642,053

UNITED STATES PATENT OFFICE.

JOHN JAMES WARREN, OF BROWNVILLE, NEW YORK.

TRUING LATHE FOR WOOD-PULP GRINDERS.

Original application filed October 14, 1922, Serial No. 594,501. Divided and this application filed March 4, 1924. Serial No. 696,781.

This invention relates to the grinding of wood into the so-called "mechanical" pulp used in the manufacture of newsprint and other cheap papers, and in particular it relates to means for truing the grindstone and keeping its cutting face in condition for efficient grinding. The present application is a division of my copending application, Serial No. 594,501 filed Oct. 14, 1922.

In accordance with this invention, I have provided a truing lathe particularly adapted for truing the grindstone of a grinder of the type disclosed in my copending application, Serial No. 594,501. The novel features of this truing lathe and its mounting are: first—it extends beyond the grindstone housing on either side thereof, so that the carriage of the lathe can be run completely outside the housing for adjustment; second—the entire lathe can be shifted laterally so that the stone can be trued even when worn beyond the original limit of the lathe adjustment; and third—a narrow door extends across the width of the housing making it possible to follow the carriage across the face of the stone.

Figure 1:
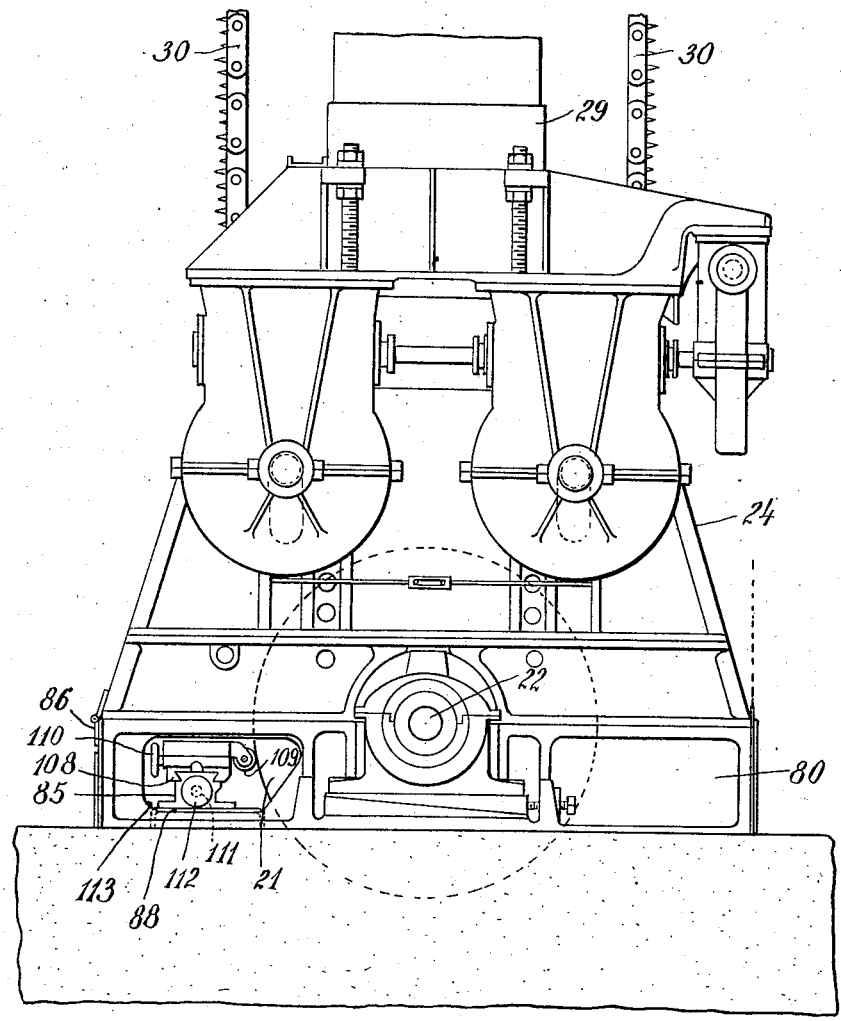
Figure 2:
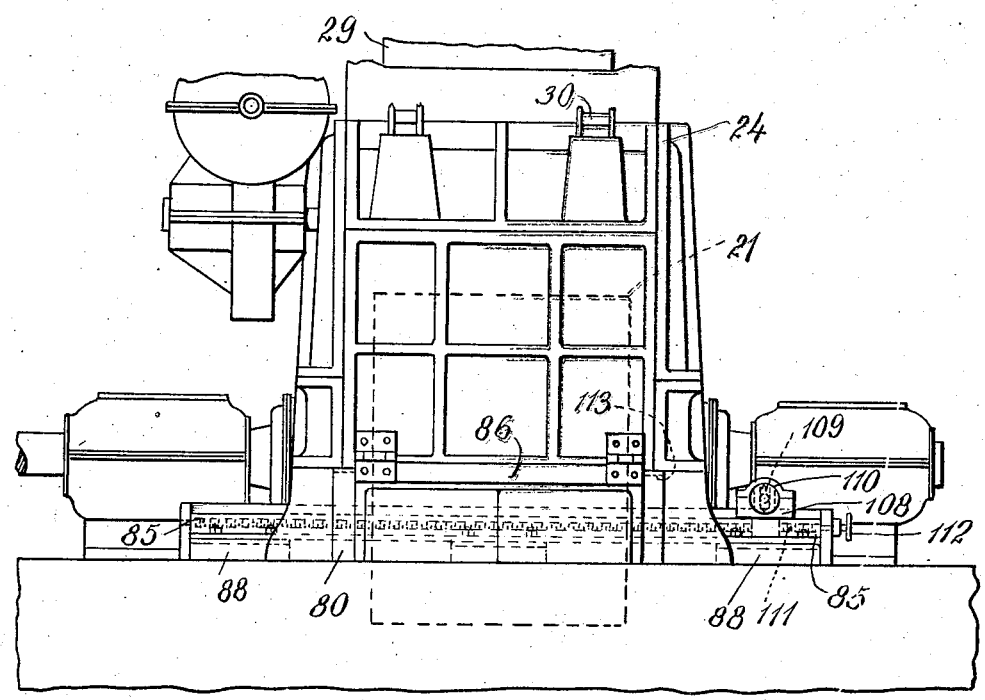

A preferred embodiment of my invention is shown in the accompanying drawing, in which Figure 1 represents an elevation of the lower end of a magazine grinder constructed in accordance with the disclosure in my copending application, and Figure 2 is an elevation of the lower end of the same grinder, but looking in a direction at right angles to that in which Figure 1 is viewed.

The grinder shown in this figure comprises the ordinary cylindrical grindstone 21 enclosed within a housing 24, and mounted on a shaft 22. The housing itself is supported by sole plates 80. Adjustably mounted on the housing 24, and located centrally over the grindstone is a vertical magazine 29 into the upper end of which is placed the wood to be ground. This wood is positively and continuously forced against the grindstone by means of a series of endless chains 30, two located at each of the two opposite sides of the magazine parallel with the shaft 22. The operation of these chains has been described in detail in my copending application, and will not be repeated here as it forms no part of the present invention.

Situated at the bottom of the housing and mounted upon the sole plates 80, are a series of brackets 88 upon which is mounted the guideway 85 of the truing lathe, upon which the carriage 108 is mounted for sliding movement. Extending inwardly from the body of this carriage is the ordinary burr 109, which contacts with the cutting face of the grindstone and trues it. Adjustment of the burr toward and away from the grindstone is effected in the first instance by means of a hand wheel 110 and its associated mechanism. Transverse movement of the carriage across the face of the grindstone is effected by means of a feed screw 111 which makes contact with a half nut on the lathe. Rotation of this feed screw is effected by means of a hand wheel 112.

The guideway 85 extends beyond the housing on both sides thereof, and the carriage can be moved completely without the housing, through openings 113, as shown most clearly in Figure 2. Thus when adjustments become necessary they can be made wholly without the housing, and it is unnecessary for the operator to extend his arms within the housing and in dangerous proximity to the rapidly rotating stone.

Although movement of the burr toward and away from the stone is effected in the first instance by means of hand wheel 110 and its associated mechanism, it often happens that the grindstone wears down to a point where further inward movement of the burr becomes impossible through this means. In accordance with the present invention, I have so mounted the guideway 85 upon the brackets 88 that it can be moved bodily when the necessity arises and the range over which the lathe is adjustable thus increased.

In order to follow the carriage across the face of the guideway, I have provided a narrow door 86 in the base of the housing.

I claim:

1. In a woodpulp grinder, the combination of a grindstone, a housing therefor, a truing lathe in the housing, a guideway therefor extending across the housing and outwardly therefrom, so that the lathe carriage can be run out of the housing when necessary.

2. In a woodpulp grinder, the combination of a grindstone, a housing therefor, a truing lathe in the housing, a burr on the lathe, a guideway for the lathe parallel to the face of the stone, means for moving the lathe along the guideway longitudinally of the face of the stone, means for moving the burr toward and away from the stone, brackets supporting the guideway, and means for moving the guideway and lathe on the brackets transversely of the face of the stone.

In testimony whereof I affix my signature.

JOHN JAMES WARREN.